(12) United States Patent
Bowden et al.

(10) Patent No.: US 8,287,605 B2
(45) Date of Patent: Oct. 16, 2012

(54) METHOD OF MAKING CATHODE

(75) Inventors: William L. Bowden, Nashua, NH (US); Klaus Brandt, Kamenz (DE); Ignacio Chi, Mahtomedi, MN (US); Ou Mao, Walpole, MA (US); Brian McGovern, Brookfield, CT (US); Rimma A. Sirotina, Ashland, MA (US)

(73) Assignee: The Gillette Company, Boston, MA (US)

( * ) Notice: Subject to any disclaimer, the term of this patent is extended or adjusted under 35 U.S.C. 154(b) by 1059 days.

(21) Appl. No.: 12/048,628

(22) Filed: Mar. 14, 2008

(65) Prior Publication Data

US 2008/0155812 A1 Jul. 3, 2008

Related U.S. Application Data

(62) Division of application No. 10/648,801, filed on Aug. 27, 2003, now abandoned.

(51) Int. Cl.
*H01M 6/00* (2006.01)

(52) U.S. Cl. .............. 29/623.1; 429/224; 429/231.7; 429/231.95

(58) Field of Classification Search ........... 429/231.1, 429/224, 231.7, 231.9, 209, 231.95, 218.1; 252/182.1; 29/623.1, 623.3
See application file for complete search history.

(56) References Cited

U.S. PATENT DOCUMENTS

| | | | |
|---|---|---|---|
| 4,133,856 A | 1/1979 | Ikeda et al. | |
| 4,327,166 A | 4/1982 | Leger | |
| 4,328,288 A | 5/1982 | Taylor | |
| 5,156,933 A | 10/1992 | Yamaguchi et al. | |
| 5,277,890 A | 1/1994 | Wang et al. | |
| 5,348,726 A | 9/1994 | Wang et al. | |
| 5,391,365 A | 2/1995 | Wang et al. | |
| 5,482,796 A | 1/1996 | Wang et al. | |
| 5,698,176 A | 12/1997 | Capparella et al. | |
| 5,863,675 A | 1/1999 | Capparella et al. | |
| 6,190,800 B1 | 2/2001 | Iltchev et al. | |
| 6,403,257 B1 | 6/2002 | Christian et al. | |
| 6,440,181 B1 | 8/2002 | Bowden et al. | |
| 2002/0081490 A1* | 6/2002 | Ferraro et al. | 429/164 |
| 2002/0090548 A1* | 7/2002 | Gan et al. | 429/128 |
| 2003/0118892 A1* | 6/2003 | Ray et al. | 429/82 |
| 2003/0129485 A1* | 7/2003 | Guidi et al. | 429/128 |
| 2003/0134188 A1 | 7/2003 | Roy et al. | |

FOREIGN PATENT DOCUMENTS

| | | |
|---|---|---|
| EP | 1 126 539 A2 | 8/2001 |
| EP | 1 156 544 A2 | 11/2001 |
| EP | 1 326 295 A2 | 7/2003 |
| EP | 1 460 700 A2 | 9/2004 |
| WO | WO 99/59215 | 11/1999 |
| WO | WO 02/04352 A2 | 1/2002 |

OTHER PUBLICATIONS

Liu, R. et al. Journal of Materials Science & Technology, 9, 157-160 (1993).
Nohma, T. et al., Journal of Power Sources, 32, 373-379 (1990).
Hill, L. et al., Journal of New Materials for Electrochemical Systems 5, 129-133, (2002).
Hill, L. et al., Electrochemical and Solid-State Letters 4, D1-D3, (2001).
N. Iltchev et al., *J. Power Sources* (1991) 35, 175.
V. Maner et al., *J. Power Sources* (1989) 25, 167.
N. Iltchev et al., *J. Power Sources* (1989) 25, 177.
N. Iltchev et al., *Progress in Batteries and Solar Cells* (1991) 10, 232.

* cited by examiner

*Primary Examiner* — Raymond Alejandro
(74) *Attorney, Agent, or Firm* — Fish & Richardson P.C.

(57) ABSTRACT

A method of making a cathode for a lithium primary battery includes lithiated manganese dioxide and a carbon fluoride. The cathode can provide high capacity and voltage with low gassing.

4 Claims, 3 Drawing Sheets

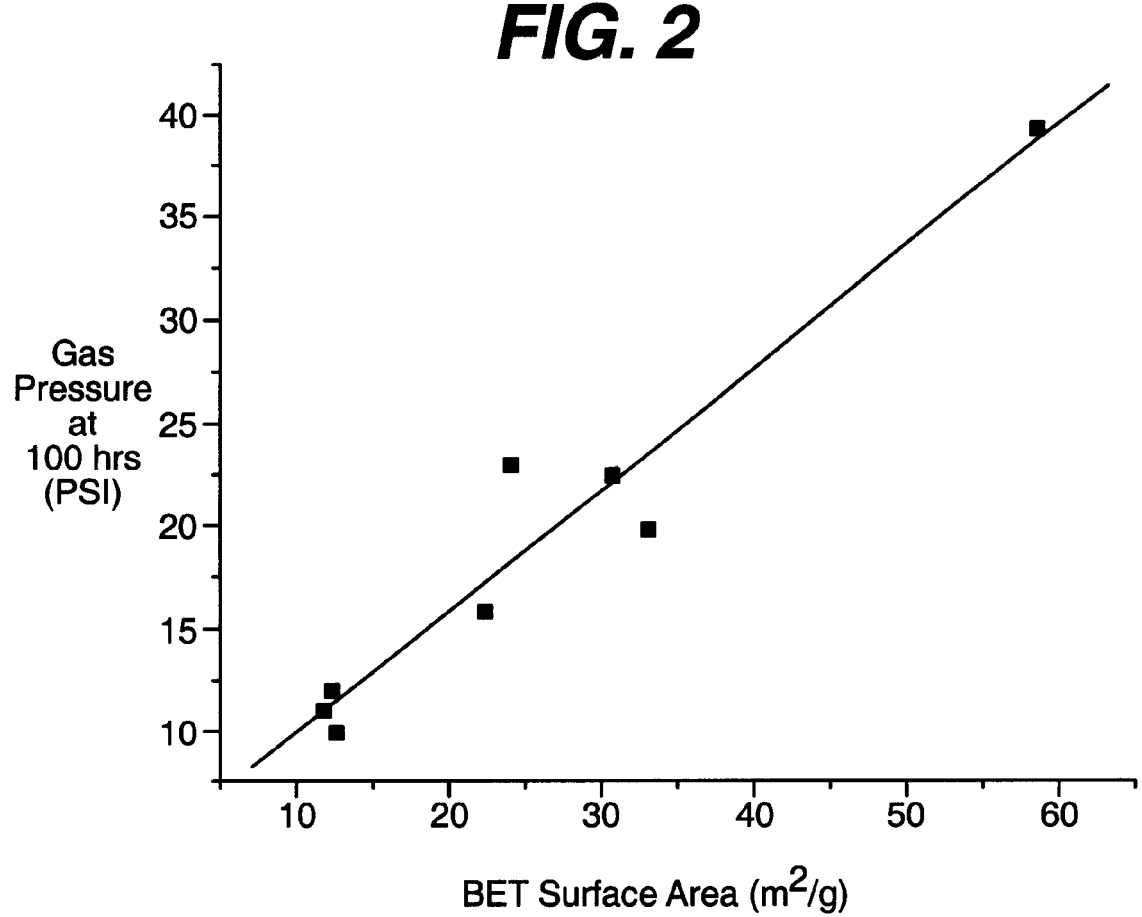

METHOD OF MAKING CATHODE

CROSS-REFERENCE TO RELATED APPLICATION

This application is a divisional application of and claims priority to abandoned U.S. Ser. No. 10/648,801, filed on Aug. 27, 2003, now abandoned, which is hereby incorporated by reference.

TECHNICAL FIELD

This invention relates to cathode materials, and more particularly to cathode materials for primary lithium batteries.

BACKGROUND

Primary lithium batteries are widely used as power sources in applications where the benefits of high power capability, high voltage and excellent capacity retention outweigh the cost of the cell. In particular, lithium batteries can be valuable in point-and-shoot cameras that use battery power for many functions, including the range finder, film drive, exposure meter, and built-in flash. Improved cameras, such as digital cameras, can require more powerful and smaller batteries than film cameras. To meet this need for greater power capability in primary lithium batteries without compromising their stability, a series of improvements in cathode materials, particularly manganese dioxide cathode materials, have been developed.

SUMMARY

In general, a cathode material includes an irreversible high capacity material and a reversible low capacity material. In another aspect, a cathode material includes a low surface area lithiated manganese dioxide. The reversible low capacity material can include a lithiated manganese dioxide. The irreversible high capacity material can include a carbon fluoride. The lithiated manganese dioxide can have a low specific surface area as measured by the BET method.

In another aspect, a primary lithium battery includes a cathode including an irreversible high capacity material and a reversible low capacity material, an anode including lithium, and a separator between the cathode and the anode. In another aspect, a primary lithium battery includes a cathode including a low surface area lithiated manganese dioxide, an anode including lithium, and a separator between the cathode and the anode.

In another aspect, a method of manufacturing a cathode active material includes combining an irreversible high capacity material and a reversible low capacity material. In another aspect, a method of manufacturing a primary battery includes combining a lithiated manganese dioxide and a carbon fluoride to form a cathode material. In another aspect, a method of manufacturing a primary battery includes forming a cathode material including a low surface area lithiated manganese dioxide.

The reversible low capacity material can include a lithiated manganese dioxide. The irreversible high capacity material can include a carbon fluoride. The lithiated manganese dioxide and the carbon fluoride can be blended. The lithiated manganese dioxide can include an electrolytic manganese dioxide or a chemical manganese dioxide. The carbon fluoride can be $CF_x$. The lithiated manganese dioxide and the carbon fluoride can be present in a ratio in the range of 1:99 to 99:1, in the range of 5:95 to 95:5, in the range of 25:75 to 75:25, or in the range of 20:80 to 80:20 by weight. The low surface area lithiated manganese dioxide can have a specific surface area of between 0.50 and 20.0 $m^2/g$, or between 10.0 and 15.0 $m^2/g$. The low surface area lithiated manganese dioxide, when mixed with an electrolyte including an organic solvent and a lithium salt, can produce a gas pressure of no more than 16 PSI after 100 hours at 70° C.

The battery can deliver a capacity at least 40% greater than the sum of the expected capacities of the lithiated manganese dioxide and the irreversible high capacity material under high drain conditions. The battery can include an electrolyte including an organic solvent.

The method can include forming a cathode including the cathode material. The method can include assembling the cathode with an anode including lithium in a housing. The method can include assembling the cathode with an electrolyte including an organic solvent in the housing.

Typical alkaline batteries do not deliver the high power and energy density necessary to give good service in digital cameras. Rechargeable batteries can offer the energy density necessary for good service, but the high cost, poor charge retention, and complication of battery charging can make a rechargeable battery unattractive to a consumer. Lithium primary batteries can typically meet the power demands of a digital camera, but higher capacities, and therefore longer service lifetimes, are desirable. A lithium battery that includes a cathode material including a lithiated manganese dioxide and $CF_x$ can have a greater capacity than a battery with a cathode material including only lithiated manganese dioxide, and can provide a higher voltage than a cathode material including only $CF_x$.

When incorporated in a battery with an electrolyte including an organic solvent, typical lithiated manganese dioxide cathode materials generate gas. The gas generation can be due to oxidation of the organic solvents in the electrolyte by high energy surface sites on the manganese dioxide. Over time, enough gas can be generated to render the battery nonfunctional, such that the shelf life of the battery is impractically short. Gas generation can be prevented and battery shelf life thus extended by predischarging the cell, which consumes a portion of the cell capacity. A low surface area lithiated manganese dioxide can generate less gas than other lithiated manganese dioxide materials when included in a lithium battery. A battery including a low surface area lithiated manganese dioxide can have a useful shelf life without the need to predischarge the battery. A cathode material can include low surface area lithiated manganese dioxide and $CF_x$.

The details of one or more embodiments are set forth in the accompanying drawings and the description below. Other features, objects, and advantages will be apparent from the description and drawings, and from the claims.

DESCRIPTION OF DRAWINGS

FIG. 2 is a graph depicting the relationship between gassing of manganese dioxide materials and BET surface area.

DETAILED DESCRIPTION

Figure 1:
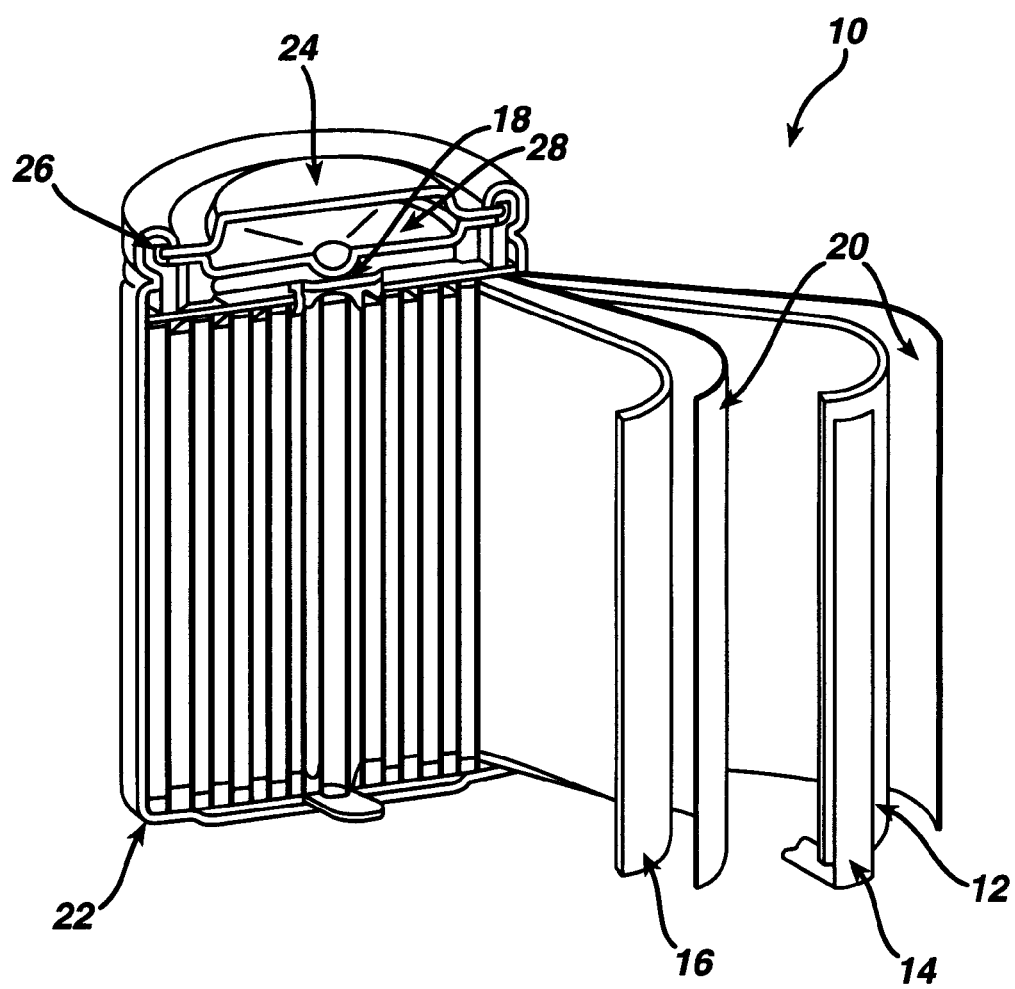
FIG. 1 is a schematic drawing of a battery.

Referring to FIG. 1, a lithium primary electrochemical cell 10 includes an anode 12 in electrical contact with a negative lead 14, a cathode 16 in electrical contact with a positive lead 18, a separator 20 and an electrolyte. Anode 12, cathode 16, separator 20 and the electrolyte solution are contained within housing 22. The electrolyte can be a solution that includes a solvent system and a salt that is at least partially dissolved in the solvent system. One end of housing 22 is closed with a cap 24 and an annular insulating gasket 26 that can provide a gas-tight and fluid-tight seal. Positive lead 18 connects cathode 16 to cap 24. A safety valve 28 is disposed in the inner side of cap 24 and is configured to decrease the pressure within battery 10 when the pressure exceeds some predetermined value. Electrochemical cell 10 can be, for example, a cylindrical wound cell, a button or coin cell, a prismatic cell, a rigid laminar cell or a flexible pouch, envelope or bag cell.

Anode 12 can include alkali and alkaline earth metals, such as lithium, sodium, potassium, calcium, magnesium, or alloys thereof. The anode can include alloys of alkali or alkaline earth metals with another metal or other metals, for example, aluminum. An anode including lithium can include elemental lithium or lithium alloys, or combinations thereof.

The electrolyte can be a nonaqueous electrolyte solution including a solvent and a salt. The salt can be an alkali or alkaline earth salt such as a lithium salt, a sodium salt, a potassium salt, a calcium salt, a magnesium salt, or combinations thereof. Examples of lithium salts include $LiPF_6$, $LiBF_4$, $LiAsF_6$, $LiClO_4$, LiI, LiBr, $LiAlCl_4$, $Li(CF_3SO_3)$, $LiN(CF_3SO_2)_2$, and $LiB(C_6H_4O_2)_2$. The solvent can be an organic solvent. Examples of an organic solvent include a carbonate, an ether, an ester, a nitrile or a phosphate. Examples of a carbonate include ethylene carbonate, propylene carbonate, diethyl carbonate or ethylmethyl carbonate. Examples of an ether include diethyl ether, dimethyl ether, dimethoxyethane or diethoxyethane. Examples of an ester include methyl propionate, ethyl propionate, methyl butyrate or gamma-butyrolactone. An example of a nitrile includes acetonitrile. Examples of a phosphate include triethylphosphate or trimethylphosphate. The electrolyte can be a polymeric electrolyte. The concentration of the salt in the electrolyte can range from about 0.01 molar to about 3 molar, from about 0.5 molar to about 1.5 molar, or, in certain embodiments, about 1 molar.

Separator 20 can be formed of any of the standard separator materials used in lithium primary or secondary batteries. For example, separator 20 can be formed of a polypropylene, a polyethylene, a polyamide (e.g., a nylon), a polysulfone and/or a polyvinyl chloride. Separator 20 can have a thickness of from about 12 microns to about 75 microns and more preferably from 25 to about 37 microns.

Separator 20 can be cut into pieces of a similar size as anode 12 and cathode 16 and placed therebetween as shown in FIG. 1. Anode 12, cathode 16 and separator 20 can then be placed within housing 22 which can be made of a metal such as nickel or nickel plated steel, stainless steel, or aluminum-clad stainless steel, or a plastic such as polyvinyl chloride, polypropylene, a polysulfone, ABS or a polyamide. Housing 22 containing anode 12, cathode 16 and separator 20 can be filled with the electrolyte solution and subsequently hermetically sealed with cap 24 and annular insulating gasket 26.

Cathode 16 includes a cathode active material that can undergo alkali ion insertion during discharge of battery 10. The cathode can also include a binder, for example, a polymeric binder such as PTFE, PVDF or Viton. The cathode can also include a carbon source, such as, for example, carbon black, synthetic graphite including expanded graphite or non-synthetic graphite including natural graphite, an acetylenic mesophase carbon, coke, graphitized carbon nanofibers or a polyacetylenic semiconductor.

A cathode material for a lithium battery can include both an irreversible high capacity material and a reversible low capacity material. The reversible low capacity material can include manganese dioxide. In a reversible discharge process, the discharged form of the cathode active material is closely related to the charged form. For example, a lithiated manganese dioxide (a reversible material) can discharge by insertion of lithium into ramsdellite domains, forming a lithiated ramsdellite structure. In contrast, discharge of a heat treated manganese dioxide (i.e., a non-lithiated manganese dioxide, a non-reversible) involves insertion of lithium into pyrolusite with decomposition of the pyrolusite and formation of an unrelated product. The manganese dioxide can be a lithiated manganese dioxide. Lithiated manganese dioxide materials and their preparation are described in, for example, U.S. Pat. Nos. 6,190,800 and 6,403,257, each of which is incorporated by reference in its entirety. Lithiation of manganese dioxide can be accomplished by ion exchange in solution with a lithium salt, for example, lithium hydroxide, or a lithium halide, such as lithium chloride, lithium bromide, lithium iodide, or a mixture of lithium hydroxide and lithium chloride. Lithiation of manganese dioxide can also be accomplished by a mechanochemical process. A variety of lithium sources, such as lithium carbonate, lithium chloride, lithium bromide, lithium iodide, or lithium methoxide can be used in mechanochemical lithiation. Lithiated manganese dioxide can be heat treated as described in U.S. Pat. No. 4,133,856, which is incorporated by reference in its entirety.

Different forms of manganese dioxide can be lithiated. For example, electrolytic manganese dioxide (EMD), such as lithium-grade or alkaline-grade EMD, chemical manganese dioxide (CMD), persulfate manganese dioxide (P-CMD) and fibrous manganese dioxide can be lithiated. It can be preferable to remove sodium ions from EMD prior to lithiation, as described, for example, in U.S. Pat. Nos. 5,698,176 and 5,863,675, each of which is incorporated by reference in its entirety.

A variety of relatively low energy density, kinetically fast cathode materials can be used with a higher capacity but kinetically slow material such as CFx. Among such materials is the rechargeable manganese dioxide known as CDMO (Li0.3MnO2). See, for example, Liu, R. et al. Journal of Materials Science & Technology, 9, 157-160 (1993), and Nohma, T. et al., Journal of Power Sources, 32, 373-379 (1990). Additional manganese dioxide materials providing the combination of fast kinetics with low capacity include the lambda-MnO2 material disclosed in U.S. patent application Ser. No. 09/988,298, now U.S. Pat. No. 6,759,167, issued Jul. 6, 2005, and filamentous ramsdellite manganese dioxide known as p-CMD and disclosed in U. S. Pat. Nos. 5,277,890, 5,348,726, 5,391,365, and 5,482,796, each of which is incorporated by reference in its entirety. Another material that can be used is the alpha phase manganese dioxide materials recently described in, for example, Hill, L. et al., Journal of New Materials for Electrochemical Systems 5, 129-133, (2002), and Hill, L. et al., Electrochemical and Solid-State Letters 4, D1-D3, (2001).

Manganese dioxide materials can be evaluated by powder X-ray diffraction. Lithium and manganese contents can be determined by inductively coupled plasma atomic emission spectroscopy. Oxygen stoichiometry (i.e., x in $MnO_x$) can be determined by titrimetry. Specific surface area can be determined from nitrogen adsorption/desorption isotherms by the BET method.

In certain circumstances, the nonaqueous electrolyte of a lithium battery can decompose and release carbon dioxide gas and/or hydrogen gas, an effect also known as gassing. The decomposition can be catalyzed by water on the surface of the manganese dioxide. In some cases, the presence of the generated gas can be sufficient to rupture the safety vent, which renders the battery useless. In order to minimize gassing, great care is typically exercised to eliminate water from the electrolyte and other components. Water can become adsorbed on the surface of particles in the cathode during manufacture of the cell. Even when prepared in a dry room, the cathode can contain up to 600 ppm of surface water before the battery is sealed. Under such conditions, lithium manganese dioxide cells can undergo gassing and rupture the safety vent within about ten days after they are filled with electrolyte. In order to prevent gassing, lithium manganese dioxide cells can be predischarged as described in U.S. Pat. No. 4,328,288, which is incorporated by reference in its entirety.

The predischarge process can convert the surface water to lithium oxide and hydrogen gas, thereby deactivating the catalytic surface of the manganese dioxide. The predischarge can also sacrifice about 5% of the cell capacity and increase the time required for manufacturing.

Moisture associated with manganese dioxide materials can be evaluated with a Mitsubishi CA100 moisture analyzer equipped with a VA21 modified moisture vaporizer. The temperature controller on the vaporizer, such as a Model 0689-0010 controller from Bamant Co., can allow multiple steps of temperature ramping and soaking. Surface moisture can be measured at 110° C. Structural water (also called lattice water) can be measured as the moisture evolved above 110° C. To measure structural water, samples can be pre-dried under argon flow in the moisture analyzer at 110° C. for about two hours. Moisture analysis can also be carried out with a Computrac 3000 from Arizona Instruments.

Gas formation by a manganese dioxide material can be evaluated either in-cell, for instance by incorporating the material in a 2/3A cell, or out-of-cell. Gas formation can be measured by a constant volume test using an air-tight stainless steel fixture with a pressure transducer, or in a constant pressure test using a heat-sealed aluminized foil bag. For out-of-cell testing, manganese dioxide materials can be examined alone or in combination with other cathode materials such as graphite and binders. Finished cells can also be examined by the thermal cycling leakage test, in which a cell is subjected to a repeating temperature program in an oven. The oven spends seven hours at −40° C., then warms to 70° C. in one hour, is held for fifteen hours at 70° C., and then returns to −40° C. in one hour. The mass of the cell is recorded at intervals to determine the quantity of gas that leaks out. For 2/3A cells, mass loss of less than 6 mg after 5 days of thermal cycling and less than 10 mg after 10 days is considered passing.

Typical manganese dioxide materials used in lithium manganese dioxide cells have a high specific surface area as measured by the BET method. The technical literature on lithium manganese dioxide batteries teaches that high surface area manganese dioxide is necessary for good high power performance. In particular, high specific surface area manganese dioxide used in lithium manganese dioxide cells can have a specific surface area in the range of 40 to 80 m$^2$/g. In contrast, manganese dioxide used in alkaline batteries typically has a specific surface area in the range of 25 to 35 m$^2$/g. See, for example, N. Iltchev et al., *J. Power Sources* (1991) 35, 175; *J. Power Sources* (1989) 25, 167; *J. Power Sources* (1989) 25, 177; *Progress in Batteries and Solar Cells* (1991) 10, 232; and U.S. Pat. No. 5,156,933, each of which is incorporated by reference in its entirety.

A low surface area lithiated manganese dioxide has a specific surface area less than 40.0 m$^2$/g, such as between 0.50 and 35.0 m$^2$/g, between 0.50 and 20 m$^2$/g, or between 10.0 and 15.0 m$^2$/g. Cathode materials for lithium batteries can include a low surface area lithiated manganese dioxide. Low surface area lithiated manganese dioxide can be prepared by lithiation of a low surface area manganese dioxide, such as alkaline grade manganese dioxide. In particular, the specific surface area of the low surface area lithiated manganese dioxide can be less than 40.0 m$^2$/g, such as between 0.50 and 35.0 m$^2$/g, between 0.50 and 20.0 m$^2$/g, or between 10.0 and 15.0 m$^2$/g. Surprisingly, gas generation from cathode materials including low surface area lithiated manganese dioxide can be diminished compared to conventional lithiated manganese dioxide cathode materials without loss of good high power performance. Lithium primary cells including low surface area lithiated manganese dioxide can be manufactured without a need for predischarge.

The irreversible high capacity material can include a carbon fluoride. Carbon fluoride, which includes carbon monofluoride, polycarbon monofluoride, graphite fluoride or $CF_x$, is a solid, structural, non-stoichiometric fluorocarbon of empirical formula $(CF_x)_n$ where $0<x<1.25$. One example of a $CF_x$ material is grade 1000 $CF_x$ from Advance Research Chemicals (Catoosa, Okla.). A chlorine containing $CF_xCl_y$ where x=0.9-1.0 and y=0.01-0.05 is also available from Advance Research Chemicals. When the carbon fluoride is $CF_x$, the cathode can have a higher weight capacity and volumetric capacity than heat treated EMD. The average voltage of the carbon fluoride can be lower than that of a heat treated EMD cathode material.

The cathode material can provide both high energy density and high discharge voltage. For example, a cathode material can include both manganese dioxide and a carbon fluoride, such as $CF_x$. The manganese dioxide can be, for example, EMD, or preferably a lithiated manganese dioxide or low surface area lithiated manganese dioxide. In certain circumstances, the cathode material can show a synergistic interaction between the materials at high discharge rates, allowing superior performance compared to other cathode formulations as measured by volumetric capacity and energy density. In particular, the irreversible material can have a higher open circuit voltage than the reversible material, and the reversible material can have a higher rate capability than the irreversible material. A high discharge rate is one such that the measured coulombic capacity of the battery is less than that calculated from the capacities of the active materials in the battery. See, for instance, Selim and Bro, (J. Electrochemical Society 1971), which is incorporated by reference in its entirety. In other words, the high rate capacity of a cathode including, for example, a lithiated manganese dioxide and $CF_x$, can be greater than the sum of the capacities of each material when measured separately. The proportion of lithiated manganese dioxide and $CF_x$ in the cathode material can vary. The weight ratio of lithiated manganese dioxide to $CF_x$ can be between 99:1 and 1:99, for example, 99:1, 95:5, 80:20, 75:25, 60:40, 50:50, 40:60, 25:75, 20:80, 5:95, or 1:99. A cathode material including more lithiated manganese dioxide than $CF_x$ can be preferable for heavy duty use, e.g. with nearly continuous discharge. A cathode material including more $CF_x$ than lithiated manganese dioxide can be preferable for light duty use, e.g. with long delays between pulses.

Both $CF_x$ and heat treated EMD discharge by irreversible processes. During discharge, a phase change occurs and the discharged material cannot be easily recharged. In contrast, lithiated manganese dioxide can have an initially reversible reduction process. The synergistic benefit of the lithiated manganese dioxide-$CF_x$ mixture can be due to the high voltage $CF_x$ material acting to recharge the lithiated manganese dioxide, thus allowing more complete utilization of both the $CF_x$ capacity and the fast discharge properties of the lithiated manganese dioxide. This internal recharge process can take place both during discharge and voltage recovery portions of the discharge, and can occur as follows:

During discharge: $Li_{0.1}MnO_2 + Li \rightarrow Li_{1.1}MnO_2$
$CF + Li \rightarrow LiF + C$
Internal recharge: $CF + Li_{1.1}MnO_2 \rightarrow C + LiF + Li_{0.1}MnO_2$ Cells can be discharged to determine cell performance, for example by the SPECS method as described in U.S. Pat. No. 6,440,181, which is incorporated by reference in its entirety. Power capability of the cathodes can be determined by use of a signature test. Generally, in a signature test, a cell is discharged to a given condition at a high current, then the load is removed and the cell allowed to equilibrate. A reduced load is then applied until the given condition is again reached. The process is repeated until discharge is complete. In the continuous signature test (CST), the cathode is discharged at a high drain (2C) until a cutoff voltage of 1.8 V is reached. The load is removed for 1 hour. The cell is then discharged at half the previous rate (1C) until the cutoff voltage is again reached. The procedure is repeated until the current has reached a very low value (C/512).

The intermittent signature test (IST) is more complex. The cell is discharged at the same rate for a given period of time unless the cutoff voltage is reached. The cell is then allowed to recover for 15 minutes and then placed on the same high load regime. When the cell reaches the cutoff voltage it then moves to the next lower current. For example the cells were discharged for 15 seconds at the 2C rate then allowed to recover for 15 minutes before a second discharge. As in the CST, the final current is very low. The capacity/rate relationship can be a convenient way to present results from signature tests (see R. Selim and P. Bro *J. Electrochem. Soc.* 1971).

EXAMPLE 1

EMD samples were either lithium-grade EMD from Delta (South Africa) or alkaline grade EMD from Kerr-McGee (Oklahoma City, Okla.). Heat-treated EMD (HEMD) was prepared according to U.S. Pat. No. 4,133,856. Samples of lithiated manganese dioxide were prepared separately from each type of EMD. Specific surface area of the manganese dioxide samples was measured by the BET method. The lattice moisture of the manganese dioxide samples was determined as water released above 110° C. using a Mitsubishi CA100 moisture analyzer.

Out-of-cell gassing of manganese dioxide was measured by combining a 4.55 g sample of manganese dioxide with 5 cc of electrolyte in a closed 10 cc stainless steel vessel fitted with a pressure transducer. The electrolyte was 10% ethylene carbonate, 20% propylene carbonate, 70% dimethoxyethane with 0.5 M lithium trifluoromethanesulfonate. The vessel was maintained at 70° C. and the gas pressure in the vessel was recorded for 100 hours. Table 1 presents a summary of lattice water, BET surface area, and gassing test results. Lithiation with lithium halides can reduce the BET surface area of manganese dioxide. The effect is more pronounced with LiCl than LiBr as can be seen in Table 1. The gassing results are presented graphically in FIG. 2.

Gassing of cathode materials was also tested in cells. During a foil bag test, a 2/3A cell including a low surface area lithiated manganese dioxide generated half as much as gas as a cell containing a typical lithiated manganese dioxide did in the same amount of time. A 2/3A cell including low surface area lithiated manganese dioxide can outperform a cell containing typical lithiated manganese dioxide on the thermal cycling leakage test. For example, a 2/3A cell including low surface area lithiated manganese dioxide lost about 5 mg of weight to gassing over 10 days whereas a cell containing typical lithiated manganese dioxide lost about 20 mg in the same time.

TABLE 1

| Sample Description | BET surface area (m$^2$/g) | Initial lattice moisture (ppm) | Gas pressure at 100 h (PSI) |
|---|---|---|---|
| Lithiated high power EMD | 11.7 | — | 11.0 |
| Lithiated EMD (LiCl) | 12.3 | — | 12.0 |
| High power EMD (β-converted) | 12.6 | 4,100 | 9.9 |
| Lithiated EMD (LiBr) | 22.4 | 5,300 | 15.85 |
| High power EMD (no β-conversion) | 24.0 | 17,500 | 23.0 |
| β-converted EMD | 30.8 | 5,300 | 22.5 |
| Lithiated EMD | 33.1 | 4,200 | 19.8 |
| EMD (no β-conversion) | 58.7 | 15,000 | 39.1 |

EXAMPLE 2

Figure 3A:
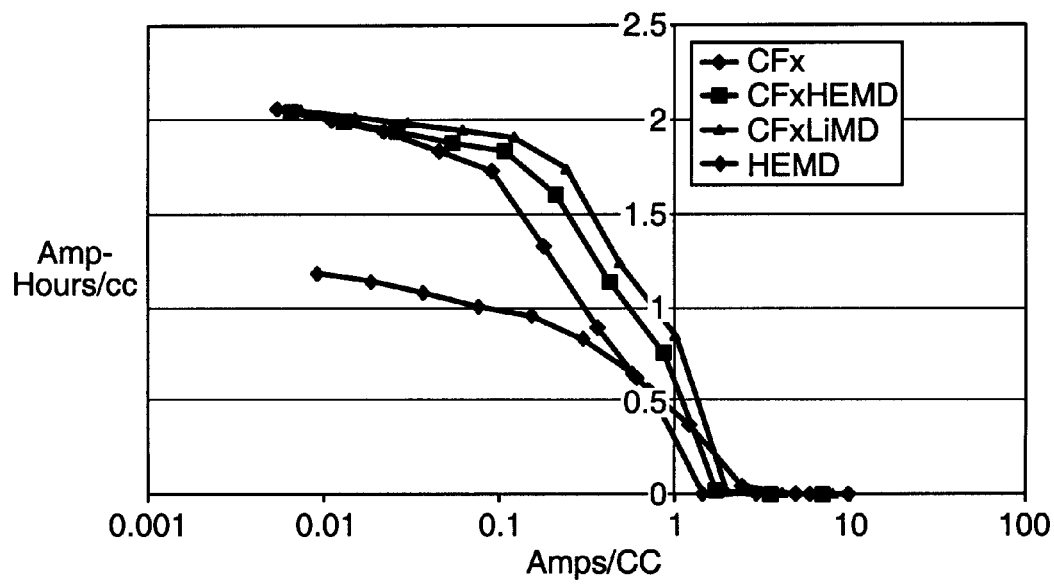
FIGS. 3A and 3B are graphs depicting volumetric capacity versus current for various cathode materials.
Figure 3B:
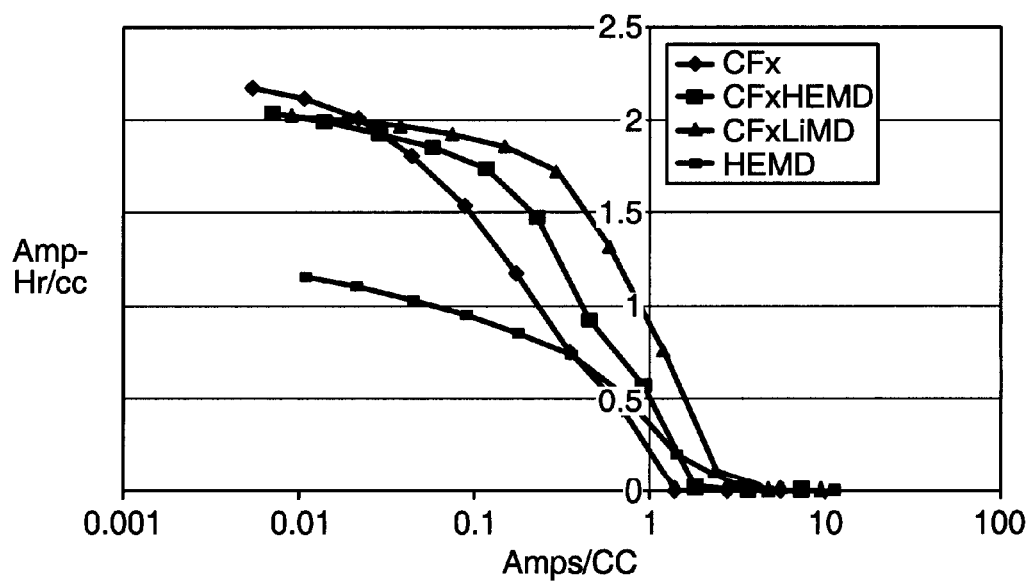

Lithium cells containing a cathode mixture of 60% active material, 30% graphite conductive diluent and 10% poly(tetrafluoroethylene) binder were prepared. The cathode active materials tested were $CF_x$, heat treated EMD, lithiated manganese dioxide (LiMD), a 50:50 mixture (by weight) of $CF_x$ and heat treated EMD, or a 50:50 mixture (by weight) of $CF_x$ and lithiated manganese dioxide. The $CF_x$ was ARC-1000 $CF_x$ from Advance Research Chemicals (Katoosa, Okla.). The heat treated EMD (HEMD) was from Kerr-McGee Chemical Co. (Oklahoma City, Okla.). The lithiated manganese dioxide (LiMD) was prepared according to U.S. Pat. No. 6,190,800. The cells were 2430-size cells prepared with electrolyte (10% ethylene carbonate, 20% propylene carbonate, 70% dimethoxyethane with 0.5 M lithium trifluoromethanesulfonate). Cells were subjected to the continuous and intermittent signature tests. Cells including a mixture of $CF_x$ and lithiated manganese dioxide had a higher volumetric capacity at a high current discharge than cells including other cathode active materials as measured by both the IST (FIG. 3A) and CST (FIG. 3B).

The mixture of lithiated manganese dioxide and $CF_x$ can have a higher capacity than the other materials tested. Table 2 shows that, under continuous discharge, the capacity of cells including manganese dioxide-$CF_x$ mixtures is greater than would be expected based on the capacities of each material alone. The synergy is more pronounced at higher rates of discharge.

TABLE 2

| Cathode | Wh at 130 mA/g | Predicted Wh at 130 mA/g | Increased capacity | Wh at 260 mA/g | Predicted Wh at 260 mA/g | Increased capacity |
|---|---|---|---|---|---|---|
| HEMD | 1.24 | — | — | 0.39 | — | — |
| LiMD | 1.71 | — | — | 0.52 | — | — |
| $CF_x$ | 1.77 | — | — | 1.10 | — | — |
| $CF_x$-HEMD | 2.03 | 1.51 | 34% | 1.28 | 0.75 | 71% |
| $CF_x$-LiMD | 2.55 | 1.74 | 47% | 1.69 | 0.81 | 109% |

Table 3 demonstrates that manganese dioxide-$CF_x$ mixtures show greater than expected capacity under intermittent discharge conditions as well.

TABLE 3

| Cathode | Wh at 130 mA/g | Predicted Wh at 130 mA/g | Increased capacity | Wh at 260 mA/g | Predicted Wh at 260 mA/g | Increased capacity |
|---|---|---|---|---|---|---|
| HEMD | 1.43 | — | — | 0.83 | — | — |
| LiMD | 1.83 | — | — | 1.65 | — | — |

TABLE 3-continued

| Cathode | Wh at 130 mA/g | Predicted Wh at 130 mA/g | Increased capacity | Wh at 260 mA/g | Predicted Wh at 260 mA/g | Increased capacity |
|---|---|---|---|---|---|---|
| $CF_x$ | 1.96 | — | — | 1.27 | — | — |
| $CF_x$-HEMD | 2.32 | 1.69 | 37% | 1.6 | 1.05 | 52% |
| $CF_x$-LiMD | 2.68 | 1.89 | 42% | 1.85 | 1.46 | 57% |

EXAMPLE 3

The performance of the materials was measured by using a simulated digital camera test. This test repeats complex series of pulses that simulate the various battery-powered operational functions performed by a digital camera. A battery including $CF_x$ as the only cathode active material did not support a single cycle of digital camera functions. When HEMD material prepared according to U.S. Pat. No. 4,133,856 was the cathode material, the battery delivered 205 cycles. A battery including LiMD cathode material (prepared according to U.S. Pat. No. 6,190,800) delivered 291 cycles. A cathode with a mixture of LiMD and $CF_x$ (90:10 LiMD:$CF_x$ by weight) delivered 379 cycles, and a cathode including 80:20 LiMD:$CF_x$ by weight delivered 441 cycles.

A number of embodiments have been described. Nevertheless, it will be understood that various modifications may be made. Accordingly, other embodiments are within the scope of the following claims.

What is claimed is:

1. A method of making a primary lithium battery comprising a cathode including cathode active material, comprising
   (a) blending a lithiated manganese dioxide and a carbon fluoride to provide a cathode mixture including the lithiated manganese dioxide and the carbon fluoride in a specific weight ratio;
   (b) using the cathode mixture to form a cathode adjacent a first surface of a separator, wherein the only cathode active material in the cathode consists of the lithiated manganese dioxide and the carbon fluoride in the specific weight ratio;
   (c) providing an anode adjacent to a second surface of the separator;
   (d) assembling the cathode, separator, and anode into a cylindrical housing to provide the primary lithium battery, and wherein the lithiated manganese dioxide has a specific surface area of between 10.0 $m^2/g$ and 20.0 $m^2/g$.

2. The method material of claim 1, wherein the lithiated manganese dioxide and the carbon fluoride are present in a ratio in the range of 20:80 to 80:20 by weight.

3. The method of claim 1, wherein step (a) comprises blending the carbon fluoride, the lithiated manganese dioxide, and a carbon source to provide the cathode mixture.

4. The method of claim 1, wherein step (a) comprises blending the carbon fluoride, the lithiated manganese dioxide, and a binder to provide the cathode mixture.

* * * * *

UNITED STATES PATENT AND TRADEMARK OFFICE
CERTIFICATE OF CORRECTION

PATENT NO. : 8,287,605 B2  
APPLICATION NO. : 12/048628  
DATED : October 16, 2012  
INVENTOR(S) : William L. Bowden et al.

Page 1 of 1

It is certified that error appears in the above-identified patent and that said Letters Patent is hereby corrected as shown below:

Col. 1, line 6, after "to" delete "abandoned".

Signed and Sealed this  
Fifth Day of February, 2013

Teresa Stanek Rea  
*Acting Director of the United States Patent and Trademark Office*